US012573335B2

(12) United States Patent
Guo et al.

(10) Patent No.: US 12,573,335 B2
(45) Date of Patent: Mar. 10, 2026

(54) PIXEL CIRCUIT

(71) Applicant: AUO Corporation, Hsinchu City (TW)

(72) Inventors: Ting-Wei Guo, Hsinchu City (TW); Shu-Hao Huang, Hsinchu City (TW); Ching-Liang Huang, Hsinchu City (TW); Sung-Yu Su, Hsinchu City (TW); Yang-En Wu, Hsinchu City (TW)

(73) Assignee: AUO Corporation, Hsinchu City (TW)

( * ) Notice: Subject to any disclaimer, the term of this patent is extended or adjusted under 35 U.S.C. 154(b) by 0 days.

(21) Appl. No.: 18/884,152

(22) Filed: Sep. 13, 2024

(65) Prior Publication Data

US 2025/0218347 A1 Jul. 3, 2025

(30) Foreign Application Priority Data

Dec. 29, 2023 (TW) ................................ 112151615

(51) Int. Cl.

*G09G 3/32* (2016.01)
*G09G 3/20* (2006.01)
*G09G 3/3225* (2016.01)
*G09G 3/3233* (2016.01)

(52) U.S. Cl.

CPC ............. *G09G 3/32* (2013.01); *G09G 3/2003* (2013.01); *G09G 3/3225* (2013.01); *G09G 3/3233* (2013.01); *G09G 2300/0852* (2013.01); *G09G 2300/0861* (2013.01); *G09G 2320/0233* (2013.01)

(58) Field of Classification Search

CPC ...... G09G 3/2003; G09G 3/32; G09G 3/3208; G09G 3/3225; G09G 3/3233; G09G 2300/0852; G09G 2300/0861; G09G 2320/0233

USPC .................................................... 345/76, 690

See application file for complete search history.

(56) References Cited

U.S. PATENT DOCUMENTS

| | | | | |
|---|---|---|---|---|
| 5,748,160 A * | 5/1998 | Shieh | G09G 3/3258 345/82 |
| 8,963,816 B2 * | 2/2015 | Baik | G09G 3/3233 345/92 |
| 9,852,683 B2 | 12/2017 | Liu | |
| 2005/0104818 A1 * | 5/2005 | Kwak | G09G 3/3233 345/76 |
| 2005/0104875 A1 * | 5/2005 | Kwak | G09G 3/3233 345/204 |
| 2015/0339975 A1 | 11/2015 | Liu | |

FOREIGN PATENT DOCUMENTS

| | | |
|---|---|---|
| JP | 2006109594 | 4/2006 |
| TW | 201545152 | 12/2015 |
| TW | I746267 | 11/2021 |

* cited by examiner

*Primary Examiner* — Jason M Mandeville
(74) *Attorney, Agent, or Firm* — JCIPRNET

(57) ABSTRACT

A pixel circuit is disclosed. The pixel circuit includes a current generating circuit, one or more light-emitting elements, and a light-emitting control circuit. The current generating circuit receives pixel data to provide a driving current. The light-emitting element is used to provide full-color light. The light-emitting control circuit is coupled in series with the current generating circuit and the light-emitting element, and controls light-emitting brightness of the full-color light based on the driving current.

3 Claims, 5 Drawing Sheets

100b

PIXEL CIRCUIT

CROSS-REFERENCE TO RELATED APPLICATION

This application claims the priority benefit of Taiwan application serial no. 112151615, filed on Dec. 29, 2023. The entirety of the above-mentioned patent application is hereby incorporated by reference herein and made a part of this specification.

BACKGROUND

Technical Field

This disclosure relates to a pixel circuit, and in particular to a self-luminous pixel circuit.

Description of Related Art

In recent years, self-luminous display technology has become the mainstream of display devices due to the advantages of low power consumption, thinner display panels, brighter colors, and more pronounced contrast, in addition to overcoming the problem of motion blur. In order to display color images, each pixel on a display panel is divided into at least three sub-pixels (e.g., red sub-pixel, green sub-pixel, blue sub-pixel). However, the division of pixels causes an increase in the circuit area, which affects the aperture ratio of the display panel, i.e., the overall brightness of the display panel. Moreover, with the demand for augmented reality (AR) display technology, the brightness and resolution requirements of display panels are increasing. Consequently, the ability to enable pixel circuits to display full-color light while improving the aperture ratio may be considered an issue in the design of display panels.

SUMMARY

The disclosure provides a pixel circuit, which utilizes a shared driving circuit to provide full-color light in a field-sequential display method, thereby reducing an area of the pixel circuit and increasing an aperture ratio of a display panel.

The pixel circuit of the disclosure includes a current generating circuit, one or more light-emitting elements, and a light-emitting control circuit. The current generating circuit receives pixel data to provide a driving current. The light-emitting element is for providing full-color light. The light-emitting control circuit is coupled in series with the current generating circuit and the light-emitting element, and controls light-emitting brightness of the full-color light based on the driving current.

Based on the above, in the pixel circuit in the embodiment of the disclosure, through the sharing of the current generating circuit and the light-emitting control circuit, the circuit area usage of the pixel circuit can be reduced, so the aperture ratio of the pixel circuit can be improved when the pixel circuit displays full-color light.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate example embodiments of the disclosure and, together with the description, serve to explain the principles of the disclosure.

DESCRIPTION OF THE EMBODIMENTS

Unless otherwise defined, all terms (including technical and scientific terms) used herein have the same meaning as commonly understood by one of ordinary skill in the art. It should be further understood that terms such as those defined in commonly used dictionaries should be construed to have meanings consistent with their meanings in the context of the relevant technology and the disclosure, and are not to be construed as idealistic or excessive formal meaning, unless explicitly so defined herein.

It should be understood that, although the terms “first”, “second”, “third”, etc. may be used herein to describe various elements, components, regions, layers and/or sections, such elements, components, regions, layers and/or sections should not be limited by these terms. These terms are only used to distinguish one element, component, region, layer or section from another element, component, region, layer or section. Thus, a “first element”, “component”, “region”, “layer” or “section” discussed below could be termed a second element, component, region, layer or section without departing from the teachings herein.

The terminology used herein is for the purpose of describing particular embodiments only and is not intended to be limiting. As used herein, the singular forms “a”, “an” and “the” are intended to include the plural forms including “at least one” unless the content clearly dictates otherwise. The term “or” shall be construed to mean “and/or.” As used herein, the term “and/or” includes any and all combinations of one or more of the associated listed items. It should be further understood that, as used in this specification, the term “comprising” and/or “including” indicates the presence of stated features, regions, integers, steps, operations, elements, and/or components, but does not preclude the presence or addition of one or more other features, regions, integers, steps, operations, elements, components, and/or combinations thereof.

Figure 1:
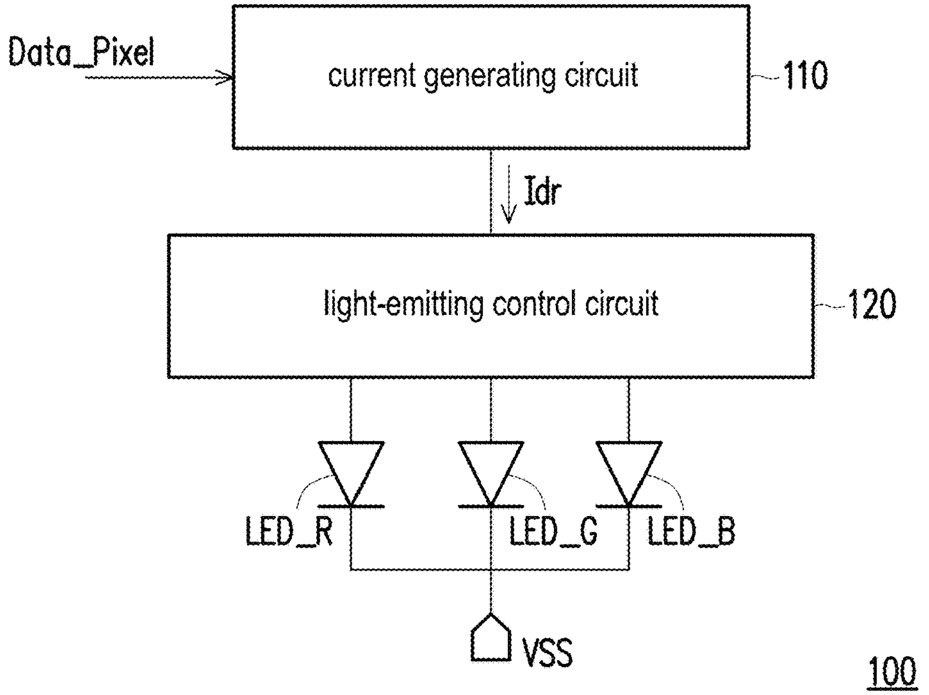
FIG. 1 is a schematic diagram of a system of a pixel circuit according to an embodiment of the disclosure.

FIG. 1 is a schematic diagram of a system of a pixel circuit according to an embodiment of the disclosure. Please refer to FIG. 1. In this embodiment, a pixel circuit 100 includes a current generating circuit 110, multiple light-emitting elements (exemplified herein by a red light-emitting diode LED_R, a green light-emitting diode LED_G, and a blue light-emitting diode LED_B), and a light-emitting control circuit 120. The current generating circuit 110 receives pixel data Data_Pixel to provide a driving current Idr. The pixel data Data_Pixel is provided by a source driver (not shown), for example. The red light-emitting diode LED_R, the green light-emitting diode LED_G, and the blue light-emitting diode LED_B are used for light mixing to provide full-color light (or any light in the visible spectrum). The light-emitting control circuit 120 is coupled in series with the current generating circuit 110, the red light-emitting diode LED_R, the green light-emitting diode LED_G, and the blue light-emitting diode LED_B, and controls the emitting brightness of the full-color light based on the driving current Idr.

Based on the above, through the sharing of the current generating circuit and the light-emitting control circuit, the circuit area usage of the pixel circuit can be reduced, so the aperture ratio of the pixel circuit can be improved when the pixel circuit displays full-color light.

Figure 2:
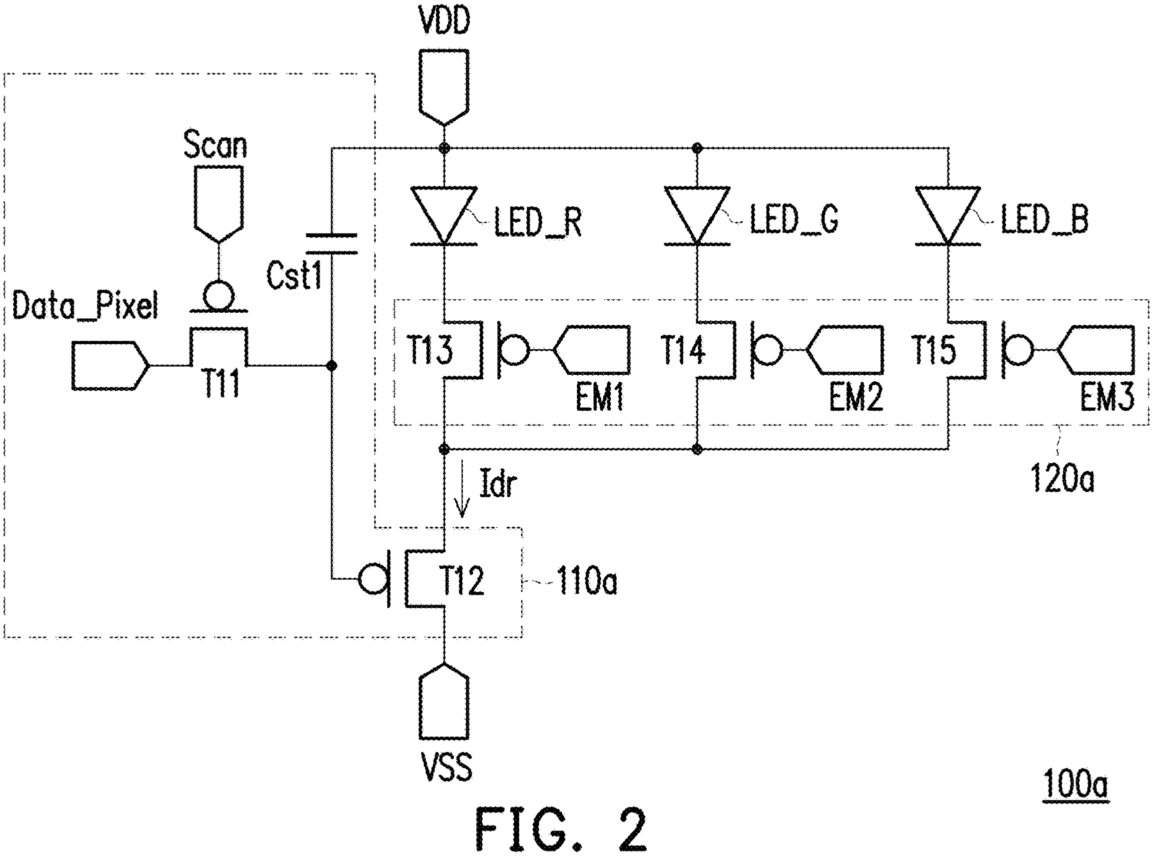
FIG. 2 is a schematic diagram of a circuit of a pixel circuit according to an embodiment of the disclosure.

FIG. 2 is a schematic diagram of a circuit of a pixel circuit according to an embodiment of the disclosure. Please refer to FIG. 1 and FIG. 2. In this embodiment, a pixel circuit 100*a* includes, for example, a current generating circuit 110*a*, a red light-emitting diode LED_R, a green light-emitting diode LED_G, a blue light-emitting diode LED_B, and a light-emitting control circuit 120*a*, where similar or identical elements are denoted by identical or similar reference numerals. The current generating circuit 110*a* includes transistors T11 and T12 (corresponding to a first transistor and a second transistor), and a storage capacitor Cst1 (corresponding to a first storage capacitor). The red light-emitting diode LED_R, the green light-emitting diode LED_G, and the blue light-emitting diode LED_B are common anode structures, that is, the anodes of the red light-emitting diode LED_R, the green light-emitting diode LED_G, and the blue light-emitting diode LED_B are collectively connected to (or coupled with) a system high voltage VDD (corresponding to a first system high voltage). Furthermore, the transistors T11 and T12 are exemplified as P-type transistors; however, the embodiment of the disclosure is not limited thereto.

The transistor T11 has a first terminal receiving the pixel data Data_Pixel, a control terminal receiving a scanning signal Scan, and a second terminal. The transistor T12 has a first terminal coupled to the light-emitting control circuit 120*a*, a control terminal coupled to the second terminal of the transistor T11, and a second terminal receiving a system low voltage VSS (corresponding to a first system low voltage), that is, the transistor T12 and the red light-emitting diode LED_R, the green light-emitting diode LED_G, the blue light-emitting diode LED_B, and the light-emitting control circuit 120*a* are coupled in series between the system high voltage VDD and the system low voltage VSS. The storage capacitor Cst1 is coupled between the system high voltage VDD and the control terminal of the transistor T12.

The light-emitting control circuit 120*a* includes transistors T13 to T15 (corresponding to third to fifth transistors). The transistors T13 to T15 are exemplified by P-type transistor, but the embodiment of the disclosure is not limited thereto. The transistor T13 has a first terminal coupled to the cathode of the red light-emitting diode LED_R, a control terminal receiving a first light-emitting signal EM1, and a second terminal coupled to the current generating circuit 110*a*, that is, the transistor T13, the red light-emitting diode LED_R, and the current generating circuit 110*a* is coupled in series between the system high voltage VDD and the system low voltage VSS.

The transistor T14 has a first terminal coupled to the cathode of the green light-emitting diode LED_G, a control terminal receiving a second light-emitting signal EM2, and a second terminal coupled to the current generating circuit 110*a*, that is, the transistor T14, the green light-emitting diode LED_G, and the current generating circuit 110*a* is coupled in series between the system high voltage VDD and the system low voltage VSS. The transistor T15 has a first terminal coupled to the cathode of the blue light-emitting diode LED_B, a control terminal receiving a third light-emitting signal EM3, and a second terminal coupled to the current generating circuit 110*a*, that is, the transistor T15, the blue light-emitting diode LED_B, and the current generating circuit 110*a* are coupled in series between the system high voltage VDD and the system low voltage VSS.

Based to the above, by triggering (or enabling) the first light-emitting signal EM1, the second light-emitting signal EM2, and the third light-emitting signal EM3 one by one, the red light-emitting diode LED_R, the green light-emitting diode LED_G, and the blue light-emitting diode LED_B can be individually illuminated and emit light.

In the embodiment of the disclosure, the first light-emitting signal EM1, the second light-emitting signal EM2, and the third light-emitting signal EM3 can individually be multi-pulse signals, that is, they can be triggered (or enabled) multiple times within a single frame period, thereby illuminating the red light-emitting diode LED_R, the green light-emitting diode LED_G, and the blue light-emitting diode LED_B multiple times.

Figure 3:
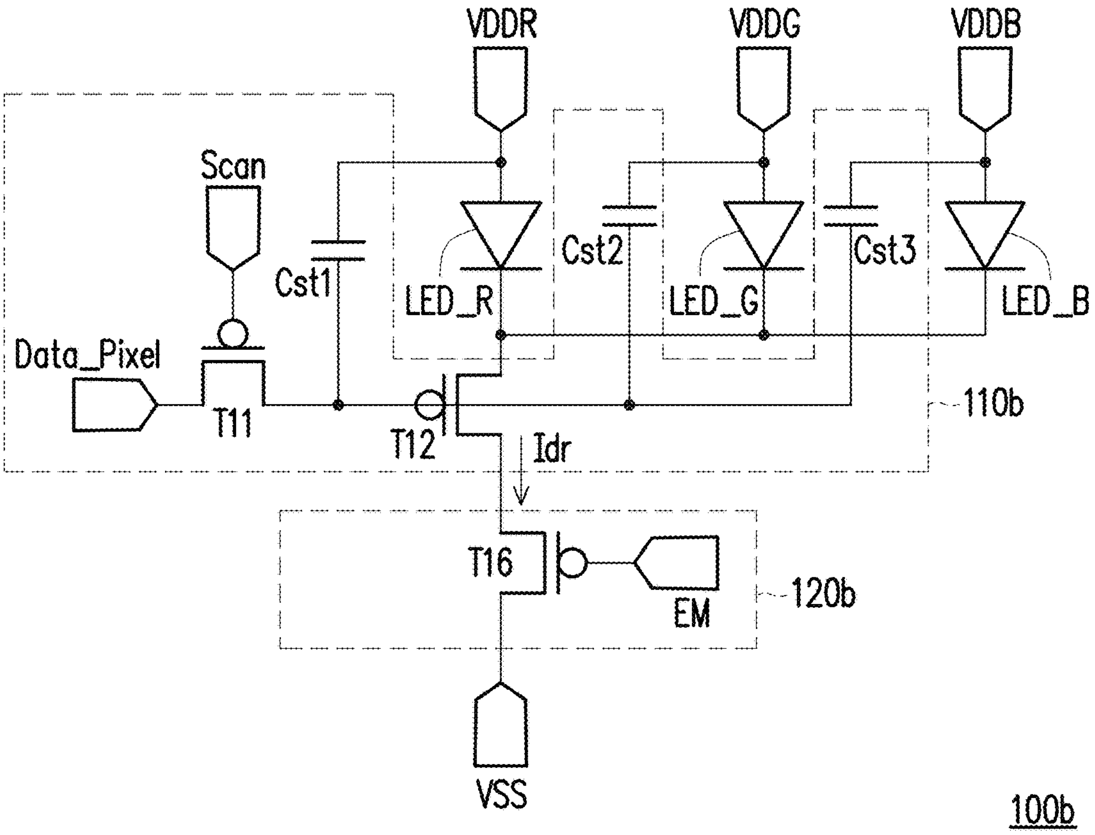
FIG. 3 is a schematic diagram of a circuit of a pixel circuit according to an embodiment of the disclosure.

FIG. 3 is a schematic diagram of a circuit of a pixel circuit according to an embodiment of the disclosure. Please refer to FIG. 1 to FIG. 3. In this embodiment, a pixel circuit 100*b* includes, for example, a current generating circuit 110*b*, a red light-emitting diode LED_R, a green light-emitting diode LED_G, a blue light-emitting diode LED_B, and a light-emitting control circuit 120*b*, where similar or identical elements are denoted by identical or similar reference numerals. In this embodiment, the anode of the red light-emitting diode LED_R receives (or is coupled to) a system high voltage VDDR (corresponding to the first system high voltage), and the anode of the green light-emitting diode LED_G receives (or is coupled to) a system high voltage VDDG (corresponding to a second system high voltage), and the anode of the blue light-emitting diode LED_B receives (or is coupled) a system high voltage VDDB (corresponding to a third system high voltage).

The current generating circuit 110*b* includes transistors T11 and T12, and storage capacitors Cst1 to Cst3 (corresponding to a first storage capacitor to a third storage capacitor). The storage capacitor Cst1 is coupled between the system high voltage VDDR and the control terminal of the transistor T12, the storage capacitor Cst2 is coupled between the system high voltage VDDG and the control terminal of the transistor T12, and the storage capacitor Cst3 is coupled between the system high voltage Between VDDB and the control terminal of transistor T12.

In this embodiment, the transistor T12 has a first terminal coupled to the cathode of the red light-emitting diode LED_R, the green light-emitting diode LED_G, and the blue light-emitting diode LED_B, a control terminal coupled to the second terminal of the transistor T11, and receives the system low voltage VSS. Furthermore, the transistor T12, the red light-emitting diode LED_R, and the light-emitting control circuit 120*b* are coupled in series between the system high voltage VDDR and the system low voltage VSS. The transistor T12, the green light-emitting diode LED_G, and the light-emitting control circuit 120*b* are coupled in series between the system high voltage VDDG and the system low voltage VSS. The transistor T12, the blue light emitting diode LED_B, and the light-emitting control circuit 120*b* are coupled in series between the system high voltage VDDR and the system low voltage VSS.

The light-emitting control circuit 120*b* includes a transistor T16 (corresponding to a third transistor). The transistor T16 is exemplified as a P-type transistor; however, the embodiment of the disclosure is not limited thereto. The transistor T16 has a first terminal coupled to the current generating circuit 110*b*, a control terminal receiving the first light-emitting signal EM, and a second terminal receiving the system low voltage VSS, that is, the transistor T13, the red light-emitting diode LED_R, the green light-emitting diode LED_G, the blue light emitting diode LED_B, and the current generating circuit 110*b* are coupled in series between one of the system high voltages VDDR, VDDG and VDDG and the system low voltage VSS.

Based on the above, by adjusting voltage levels of the system high voltages VDDR, VDDG, and VDDG one by one, the red light-emitting diode LED_R, the green light-emitting diode LED_G, and the blue light-emitting diode LED_B can be individually illuminated and emit light.

Figure 4:
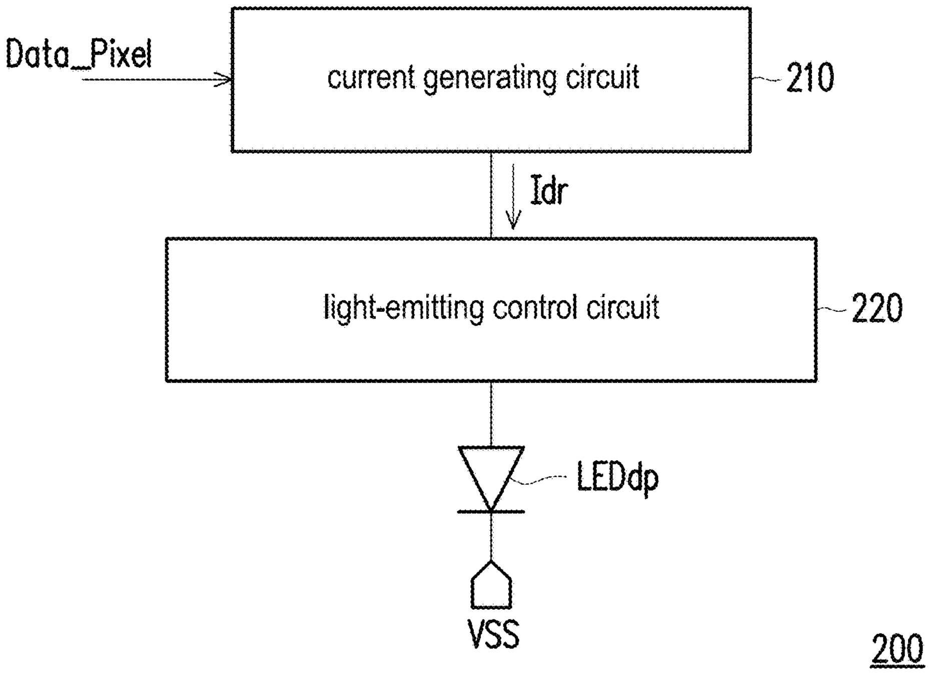
FIG. 4 is a schematic diagram of a system of a pixel circuit according to an embodiment of the disclosure.

FIG. 4 is a schematic diagram of a system of a pixel circuit according to an embodiment of the disclosure. Please refer to FIG. 4. In this embodiment, a pixel circuit 200 includes a current generating circuit 210, a light-emitting element (exemplified herein by a dynamic pixel tuning light-emitting diode LEDdp), and a light-emitting control circuit 220. The current generating circuit 210 receives the pixel data Data_Pixel to provide the driving current Idr, where the pixel data Data_Pixel is provided by a source driver (not shown), for example. The dynamic pixel tuning light-emitting diode LEDdp emits any visible color through driving at specific current densities, where the current density is simply defined as the current passing through a unit area. Furthermore, the light-emitting control circuit 220 can control the light-emitting brightness of the full-color light based on the length of time provided by the driving current Idr.

Figure 5:
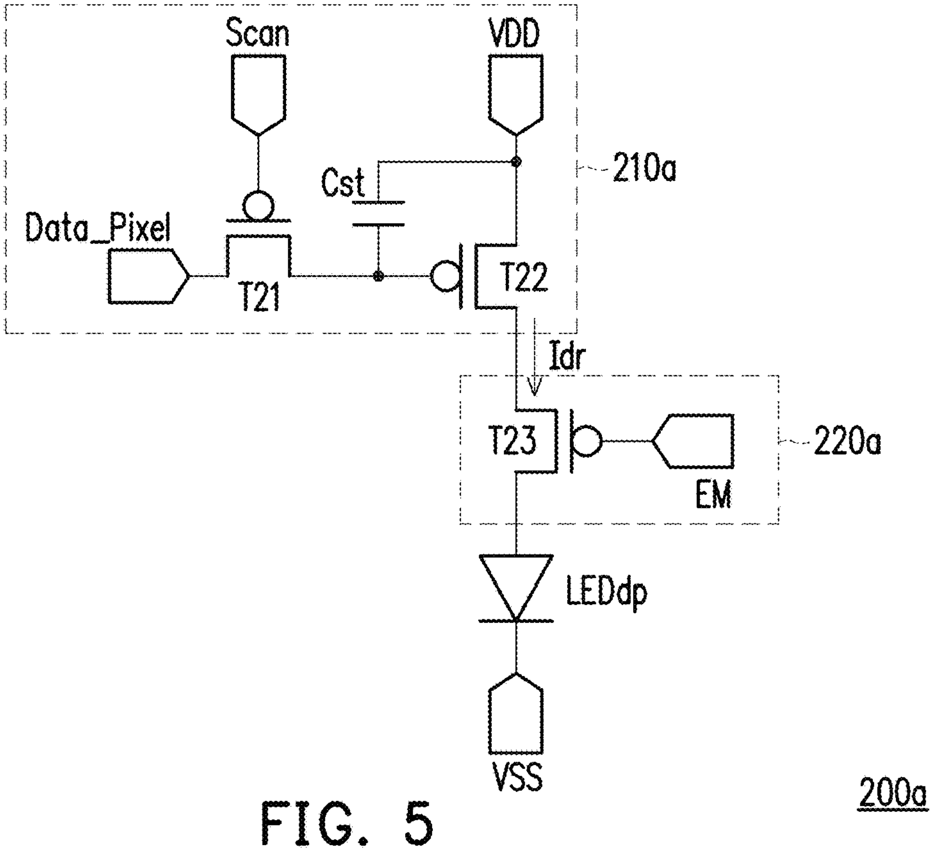
FIG. 5 is a schematic diagram of a circuit of a pixel circuit according to an embodiment of the disclosure.

FIG. 5 is a schematic diagram of a circuit of a pixel circuit according to an embodiment of the disclosure. Please refer to FIG. 4 and FIG. 5. In this embodiment, the pixel circuit 200*a* includes, for example, a current generating circuit 210*a*, a dynamic pixel tuning light-emitting diode LEDdp, and a light-emitting control circuit 220*a*, where similar or identical elements are denoted by identical or similar reference numerals.

The current generating circuit 210*a* includes transistors T21 and T22 (corresponding to a first transistor and a second transistor), and a storage capacitor Cst (corresponding to the first storage capacitor). The transistors T21 and T22 are exemplified as P-type transistors; however, the embodiment of the disclosure is not limited thereto. The transistor T21 has a first terminal receiving the pixel data Data_Pixel, a control terminal receiving the scanning signal Scan, and a second terminal. The transistor T22 has a first terminal receiving the system high voltage VDD (corresponding to the first system high voltage), a control terminal coupled to the second terminal of the transistor T21, and a second terminal for providing the driving current Idr. The storage capacitor Cst is coupled between the system high voltage VDD and the control terminal of the transistor T22. That is, the transistor T22, the dynamic pixel tuning light-emitting diode LEDdp, and the light-emitting control circuit 220*a* are coupled in series between the system high voltage VDD and the system low voltage VSS (corresponding to the first system low voltage).

The light-emitting control circuit 220*a* includes a transistor T23 (corresponding to a third transistor). The transistor T23 is exemplified as a P-type transistor; however, the embodiment of the disclosure is not limited thereto. The transistor T23 has a first terminal coupled to the current generating circuit 210*a*, a control terminal receiving the first light-emitting signal EM, and a second terminal coupled to the anode of the dynamic pixel tuning light-emitting diode LEDdp, that is, the transistor T23, the dynamic pixel tuning light-emitting diode LEDdp, and the current generating circuit 210*a* are coupled in series between the system high voltage VDD and the system low voltage VSS.

Figure 6:
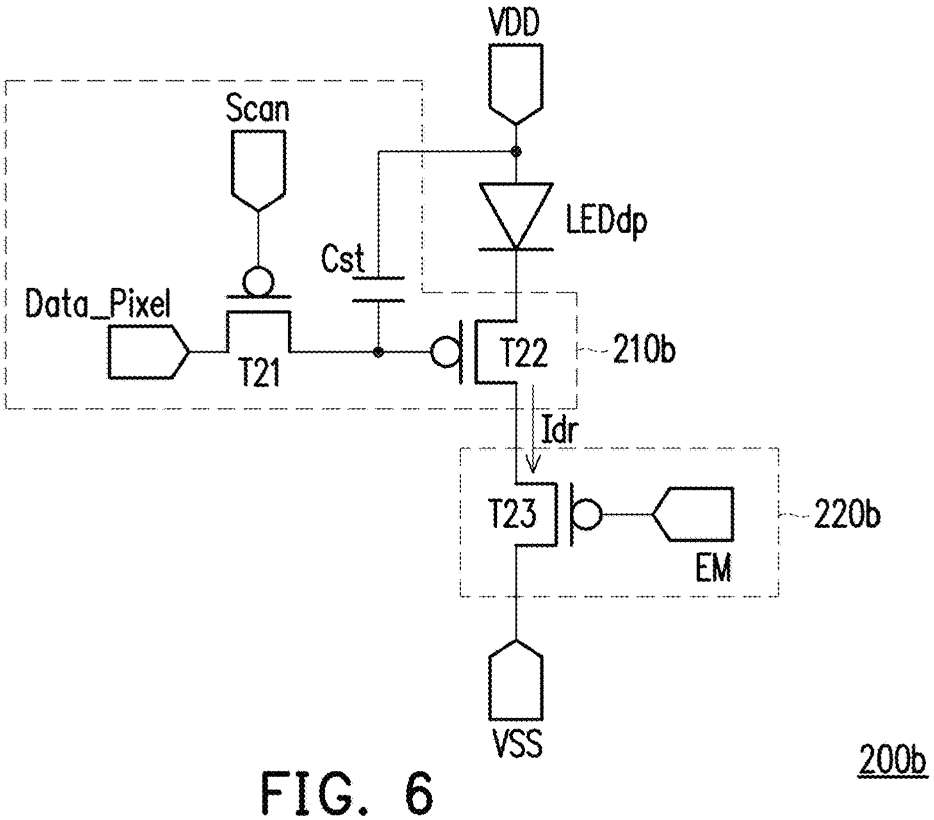
FIG. 6 is a schematic diagram of a circuit of a pixel circuit according to an embodiment of the disclosure.

FIG. 6 is a schematic diagram of a circuit of a pixel circuit according to an embodiment of the disclosure. Please refer to FIG. 4 to FIG. 6. In this embodiment, a pixel circuit 200*b* includes, for example, a current generating circuit 210*b*, a dynamic pixel tuning light-emitting diode LEDdp, and a light-emitting control circuit 220*b*. The current generating circuit 210*b* and the light-emitting control circuit 220*b* may be referenced to the current generating circuit 210*a* and the light-emitting control circuit 220*a*, where similar or identical elements are denoted by identical or similar reference numerals. The difference between the pixel circuit 200*b* and the pixel circuit 200*a* lies in that the anode of the dynamic pixel tuning light-emitting diode LEDdp in the pixel circuit 200*b* receives the system high voltage VDD. That is, the series coupling sequence between the system high voltage VDD and the system low voltage VSS is as follows: the dynamic pixel tuning light-emitting diode LEDdp, the current generating circuit 210*b*, and the light-emitting control circuit 220*b*.

Figure 7:
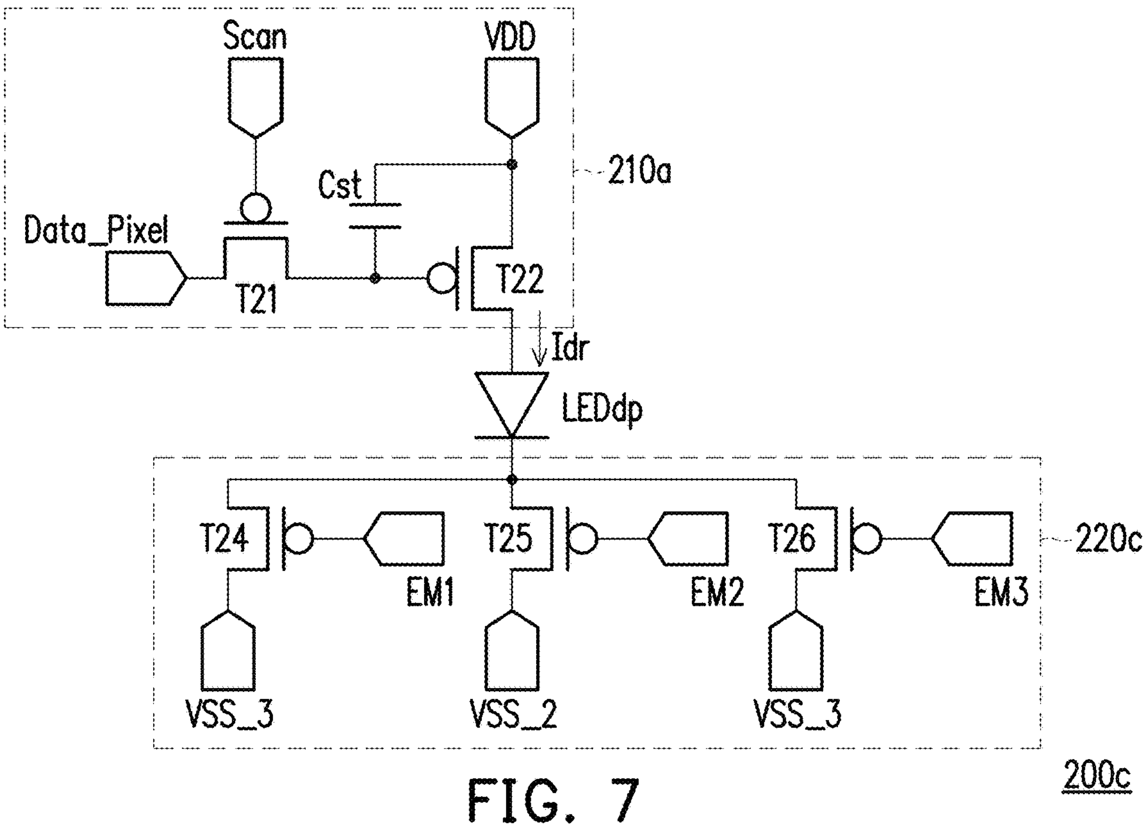
FIG. 7 is a schematic diagram of a circuit of a pixel circuit according to an embodiment of the disclosure.

FIG. 7 is a schematic diagram of a circuit of a pixel circuit according to an embodiment of the disclosure. Please refer to FIG. 4, FIG. 5, and FIG. 7. In this embodiment, the pixel circuit 200*c* includes, for example, a current generating circuit 210*a*, a dynamic pixel tuning light-emitting diode LEDdp, and a light-emitting control circuit 220*c*, where similar or identical elements are denoted by identical or similar reference numerals. In this embodiment, the light-emitting control circuit 220*c* includes transistors T24 to T26 (corresponding to a third transistor, a sixth transistor, and a seventh transistor), and the transistors T24 to T26 are exemplified as P-type transistors; however, the embodiment of the disclosure is not limited thereto.

The transistor T24 has a first terminal coupled to the cathode of the dynamic pixel tuning light-emitting diode LEDdp, a control terminal receiving the first light-emitting signal EM1, and receives a system low voltage VSS_1 (corresponding to the first system low voltage), that is, the transistor T24, the dynamic pixel tuning light-emitting diode LEDdp, and the current generating circuit 210*a* are coupled in series between the system high voltage VDD and the system low voltage VSS_1.

The transistor T25 has a first terminal coupled to the cathode of the dynamic pixel tuning light-emitting diode LEDdp, a control terminal receiving the second light-emitting signal EM2, and receives a system low voltage VSS_2 (corresponding to the second system low voltage), that is, the transistor T25, the dynamic pixel tuning light-emitting diode LEDdp, and the current generating circuit 210*a* are coupled in series between the system high voltage VDD and the system low voltage VSS_2. The transistor T26 has a first terminal coupled to the cathode of the dynamic pixel tuning light-emitting diode LEDdp, a control terminal receiving the third light-emitting signal EM3, and receives a system low voltage VSS_3 (corresponding to a third system low voltage), that is, the transistor T26, the dynamic pixel tuning light-emitting diode LEDdp, and the current generating circuit 210*a* are coupled in series between the system high voltage VDD and the system low voltage VSS_3.

Based on the above, through the corresponding triggering (or enabling) of the first light-emitting signal EM1, the second light-emitting signal EM2, and the third light-emitting signal EM3, the system low voltages VSS_1, VSS_2, and VSS_3 can be correspondingly powered.

Figure 8:
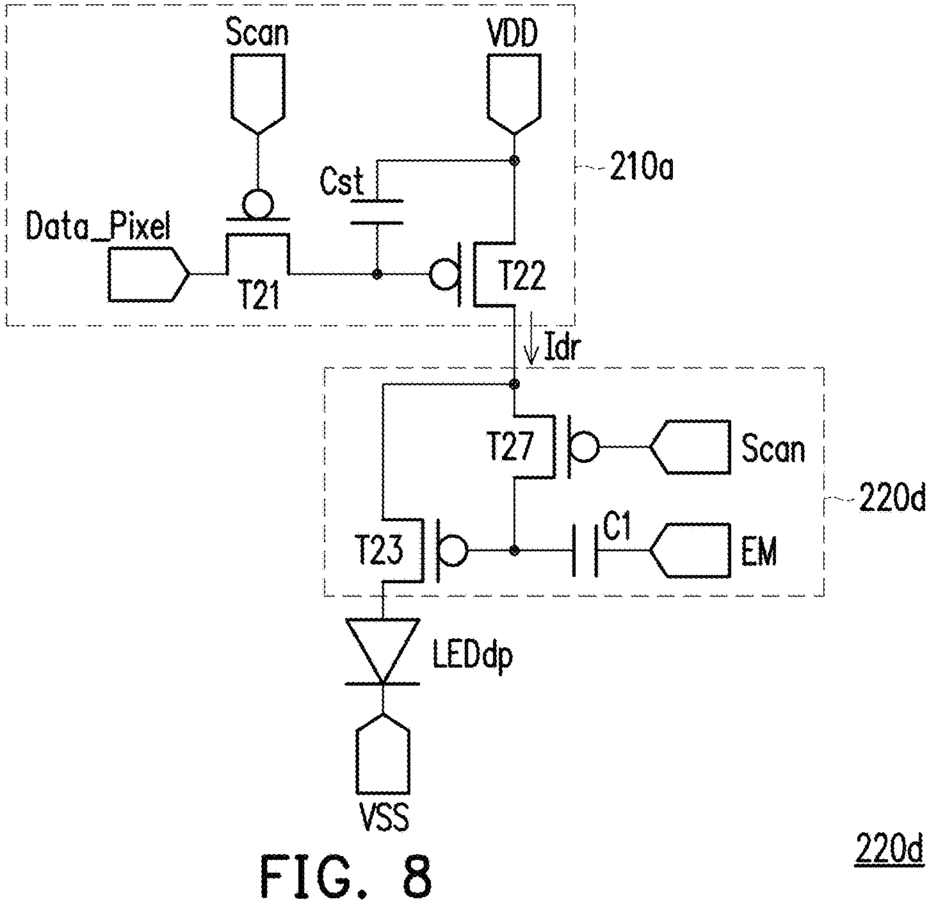
FIG. 8 is a schematic diagram of a circuit of a pixel circuit according to an embodiment of the disclosure.

FIG. 8 is a schematic diagram of a circuit of a pixel circuit according to an embodiment of the disclosure. Please refer to FIG. 4, FIG. 5, and FIG. 8. In this embodiment, a pixel circuit 200*d* includes, for example, a current generating circuit 210*a*, a dynamic pixel tuning light-emitting diode LEDdp, and a light-emitting control circuit 220*d*, where similar or identical elements are denoted by identical or similar reference numerals. In this embodiment, the light-emitting control circuit 220*d* includes transistors T23 and T27 (corresponding to the third transistor and the eighth transistor) and a capacitor C1 (corresponding to a first capacitor). The transistors T23 and T27 are exemplified as P-type transistors; however, the embodiment of the disclosure is not limited thereto.

The capacitor C1 is coupled between a control terminal of the transistor T23 and the first light-emitting signal EM. The transistor T27 has a first terminal coupled to the first terminal of the transistor T23, a control terminal receiving the scanning signal Scan, and a second terminal coupled to the control terminal of the transistor T23.

Figure 9:
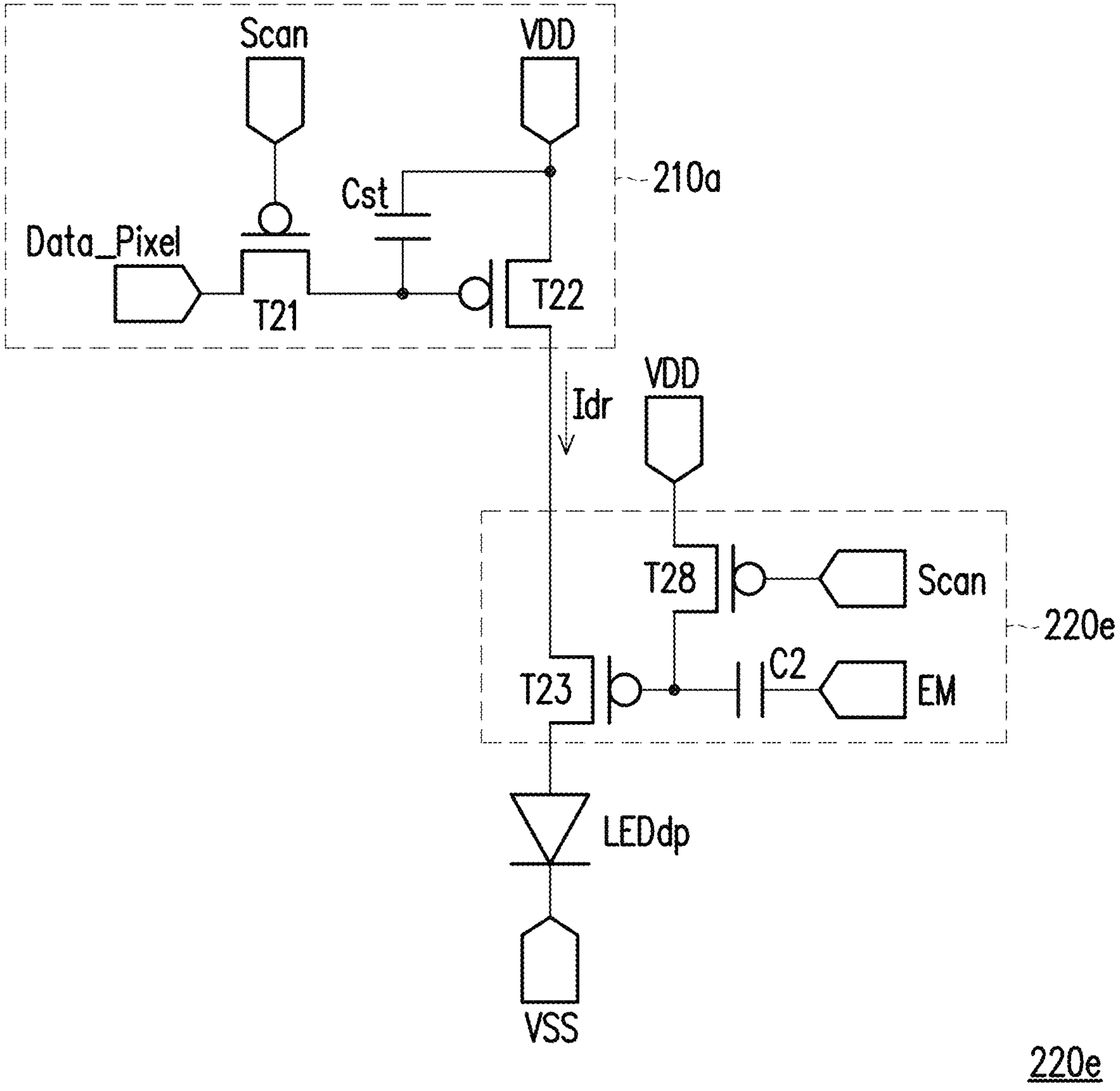
FIG. 9 is a schematic diagram of a circuit of a pixel circuit according to an embodiment of the disclosure.

FIG. 9 is a schematic diagram of a circuit of a pixel circuit according to an embodiment of the disclosure. Please refer to FIG. 4, FIG. 5, and FIG. 9. In this embodiment, a pixel circuit 200*e* includes, for example, a current generating circuit 210*a*, a dynamic pixel tuning light-emitting diode LEDdp, and a light-emitting control circuit 220*e*, where similar or identical elements are denoted by identical or similar reference numerals. In this embodiment, the light-emitting control circuit 220*e* includes transistors T23 and T28 (corresponding to the third transistor and ninth transistor) and a capacitor C2 (corresponding to a second capacitor). The transistors T23 and T28 are exemplified as P-type transistors; however, the embodiment of the disclosure is not limited thereto.

The capacitor C2 is coupled between the control terminal of the transistor T23 and the first light-emitting signal EM. The transistor T28 has a first terminal receiving the system high voltage VDD, a control terminal receiving the scanning signal Scan, and a second terminal coupled to the control terminal of the transistor T23.

To sum up, in the pixel circuit in the embodiment of the disclosure, through the sharing of the current generating circuit and the light-emitting control circuit, the circuit area usage of the pixel circuit can be reduced, so the aperture ratio of the pixel circuit can be improved when the pixel circuit displays full-color light.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A pixel circuit, comprising:

a current generating circuit, receiving pixel data to provide a driving current;

one or more light-emitting elements for providing full-color light;

a light-emitting control circuit, coupled in series with the current generating circuit and the one or more light-emitting elements, and controlling light-emitting brightness of the full-color light based on the driving current, wherein the current generating circuit comprises:

a first transistor, having a first terminal receiving the pixel data, a control terminal receiving a scanning signal, and a second terminal; and a second transistor, coupled in series with the one or more light-emitting elements and the light-emitting control circuit between a first system high voltage and a first system low voltage, a control terminal of the second transistor being coupled to the second terminal of the first transistor;

a first storage capacitor, coupled between the first system high voltage and the control terminal of the second transistor;

a second storage capacitor, coupled between a second system high voltage and the control terminal of the second transistor; and a third storage capacitor, coupled between a third system high voltage and the control terminal of the second transistor, wherein a first terminal of a first light-emitting element of the one or more light-emitting elements receives the first system high voltage, a first terminal of a second light-emitting element of the one or more light-emitting elements receives the second system high voltage, a first terminal of a third light-emitting element of the one or more light-emitting elements receives the third system high voltage, and second terminals of the first to third light-emitting elements are commonly coupled to a first terminal of the second transistor to provide the driving current flowing through the second transistor.

2. The pixel circuit according to claim 1, wherein the light-emitting control circuit comprises:

a third transistor, coupled in series with the one or more light-emitting elements and the current generating circuit between a first system high voltage and a first system low voltage, and a control terminal of the third transistor receives a first light-emitting signal.

3. The pixel circuit according to claim 1, wherein the one or more light-emitting elements comprise a red light-emitting diode, a green light-emitting diode, and a blue light-emitting diode.

* * * * *